No. 638,910. Patented Dec. 12, 1899.
E. P. COUTURE.
ROTARY ENGINE.
(Application filed Aug. 11, 1899.)
(No Model.) 2 Sheets—Sheet 1.
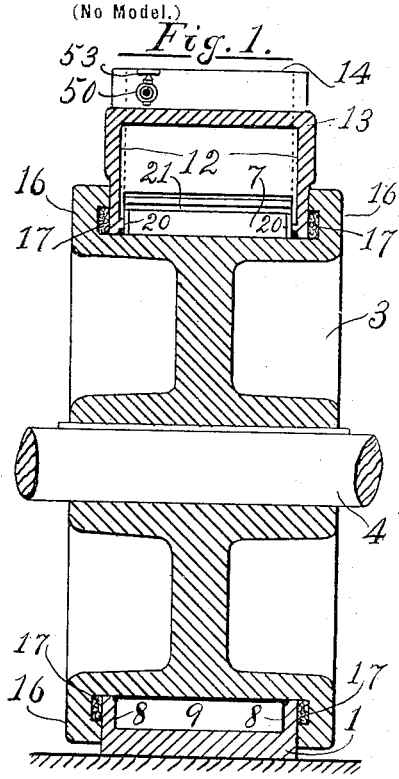
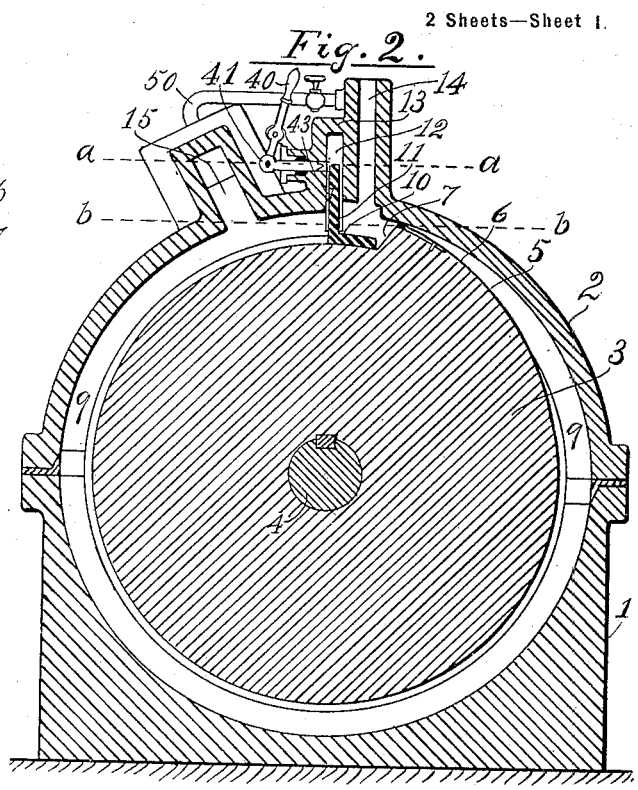
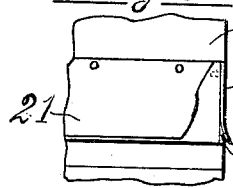
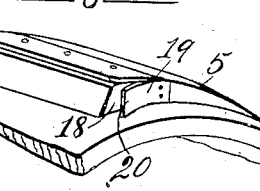
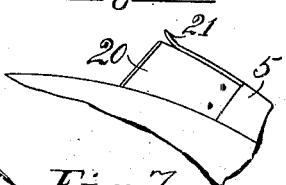
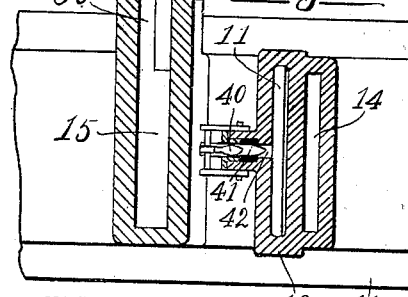
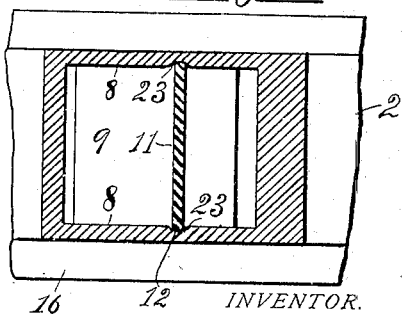
WITNESSES:
K. Lockwood Nevins.
M. R. Daniels.
INVENTOR.
E. P. Couture
BY
Frances M. Wright
ATTORNEY.
THE NORRIS PETERS CO., PHOTO-LITHO., WASHINGTON, D. C.

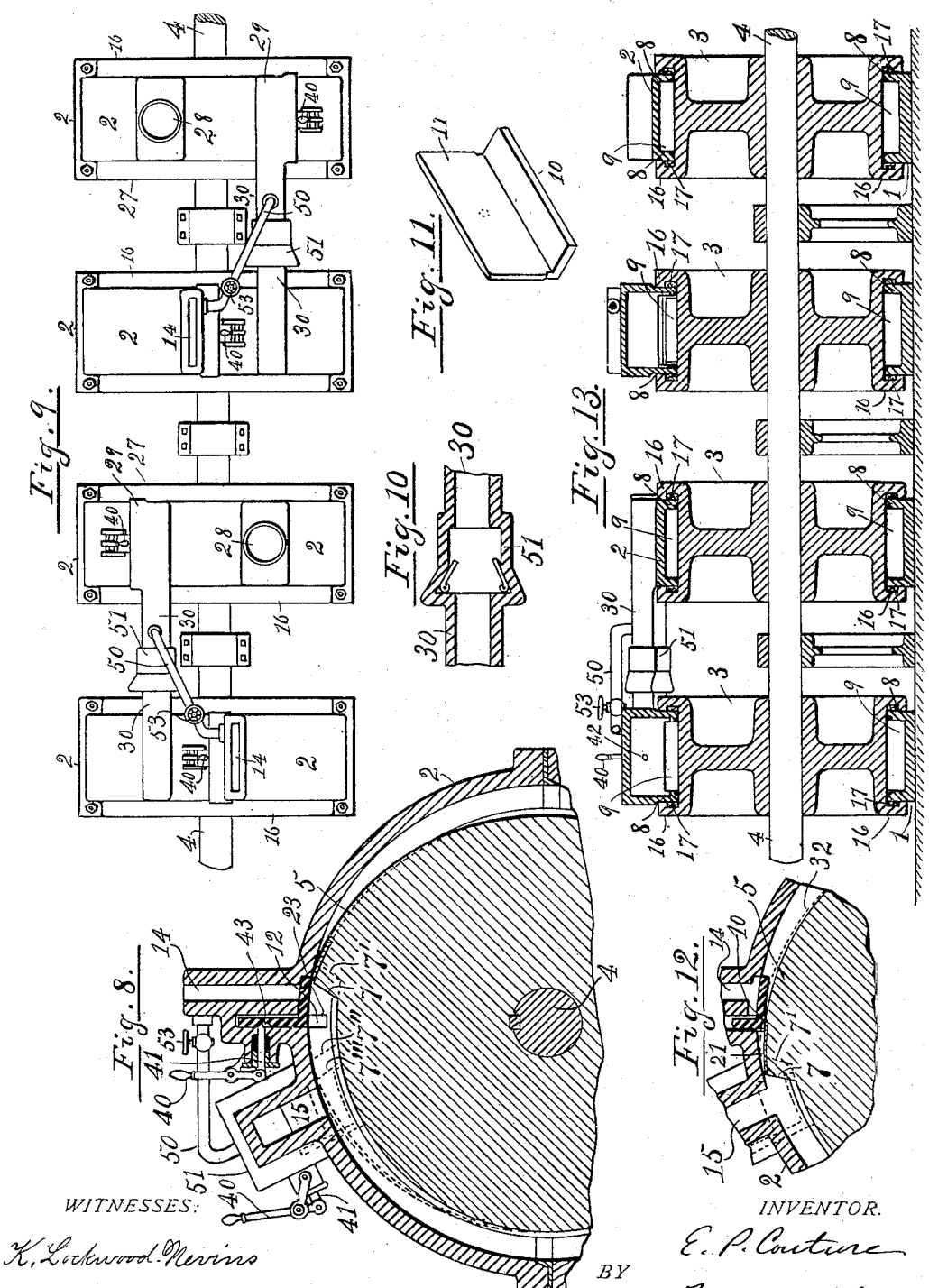

UNITED STATES PATENT OFFICE.

EUSEBE P. COUTURE, OF GUALALA, CALIFORNIA, ASSIGNOR OF TWO-THIRDS TO GEORGE RAY, OF SAME PLACE.

ROTARY ENGINE.

SPECIFICATION forming part of Letters Patent No. 638,910, dated December 12, 1899.

Application filed August 11, 1899. Serial No. 726,933. (No model.)

*To all whom it may concern:*

Be it known that I, EUSEBE PIERRE COUTURE, a citizen of the United States, residing at Gualala, in the county of Mendocino and State of California, have invented certain new and useful Improvements in Rotary Engines, of which the following is a specification.

My invention relates to improvements in rotary engines, the object of my invention being to provide an engine of this character which shall be simple in construction, economical in the application of steam, capable of attaining a high speed of rotation, and which shall comprise means for preventing wasteful escape of the live steam.

My invention therefore resides in the novel construction, combination, and arrangement of parts for the above ends hereinafter fully specified, and particularly pointed out in the claims.

In the accompanying drawings, Figure 1 is a vertical longitudinal section of one of the cylinders of the engine. Fig. 2 is a transverse section. Figs. 3, 4, and 5 are detail views of packing. Fig. 6 is a horizontal section on the line $a\ a$ of Fig. 2. Fig. 7 is a similar section on the line $b\ b$. Fig. 8 is a partial vertical transverse section showing the valve in a changed position, showing also in dotted lines the driving-shoulders of the other cylinders of the engine. Fig. 9 is a top plan view, on a reduced scale, of the engine complete for reversing. Fig. 10 is a longitudinal section through a steam connection. Fig. 11 is a perspective view of a valve. Fig. 12 is a partial section similar to Fig. 8, but with the valve in a changed position; and Fig. 13 is a vertical longitudinal section of the engine complete for reversing.

Upon a suitable base is supported the stationary annular casing 2, U-shaped in cross-section, and in said casing rotates the wheel 3, mounted on the shaft 4. Upon a portion of the circumference of said wheel is formed a shoulder 5, having a gradual front incline 6 and a sharp rear incline 7. Said shoulder moves between the opposing walls 8 of the chamber 9, formed by said casing and wheel, and in its movement said shoulder in each revolution of the wheel 3 raises an L-shaped valve 10, the vertical member 11 of which slides vertically in recesses 12, formed in the walls 8 of the chamber 9, and the upper part of said member 11 slides in a valve-casing 13, erected upon said cylindrical casing 2. Said valve is raised by the engagement of the shoulder with the horizontal member of said valve, and when said shoulder has passed said valve the valve is positively forced down by the pressure of steam upon the horizontal face of the valve, the edge of said valve sliding upon the rear inclined face of the shoulder.

The steam enters the chamber 9 by the steam-port 14 and exerts pressure between the vertical wall 11 of the valve and the rear face 7 of the shoulder 5, forcing said shoulder onward and causing the wheel 3 to rotate, the steam escaping through the exhaust-port 15 when the shoulder 5 passes said port.

In order to resist the lateral pressure of the steam upon the walls of the chamber 9, the wheel 3 is provided with flanges 16, which extend outward and parallel with and outside the walls 8 of the chamber 9, and between said walls and flanges 16 are provided packings 17. The sides of the shoulder 5, near its surface, are recessed, as shown at 18, and in said recesses are secured spring-plates 19, having their edges 20 bent outward and bearing against the walls 8 of the chamber 9. The top of the shoulder 5 is similarly recessed and has a similar spring-plate 21. It will be seen that by this construction the pressure of the steam behind said spring-plates 19 and 21 tends to press their edges against the walls and top of the chamber 9 and to render the same steam-tight, and as the engine is intended to reverse the edges 23 of the recesses 12 of the walls of the chamber 9 are rounded, so that when so reversing the edges of said plates will not catch against the edges of said recesses.

The steam does not exhaust through the exhaust-pipe 15 directly into the atmosphere, but into a second cylinder 27, constructed in its main features like the first, and in which revolves a wheel on the same shaft 4. In this second cylinder, however, the exhaust-port 28 is arranged in advance of the inlet-port 29 into said cylinder, said port 29 leading from the exhaust 15 by a conduit 30. The valve 31 is between said ports 29 28, and the incline 7' on said second wheel is located as regards the common shaft 4 a sufficient distance in advance of the incline 7 on the first wheel that if any steam escapes direct from the inlet-port 14 to the exhaust-port 15 when the incline 7 is between said ports said steam will then propel the incline 7' of the second wheel, which will not have passed its exhaust-port.

When a reversible engine is desired, I provide two of the above double cylinders on the same shaft, one pair working in one direction and the other pair in the opposite direction, and when it is desired to reverse steam is cut off from one pair and is admitted to the other pair. To cut off steam, there is provided a lever 40, which operates a dog 41, sliding through an aperture 42 on the rear wall of the valve-casing, the end of said dog engaging the rear face of the valve 10. When said dog is pushed in by means of the lever 40, then when said valve has been raised to its highest point by the shoulder 7 in its revolution the dog 41 will engage a notch 43 in the rear face of the valve 10 and hold it up, closing the steam-port 14. The engineer will then shift a similar lever in the other pair of cylinders, which will permit the valve 10 therein to fall under pressure of the steam, and the shaft will begin to rotate in the opposite direction.

In case the shaft should stop in such a position that the valve 10 closes the port 14 the following construction which I have provided will enable the engine to be started. A pipe 50 leads from the main steam-pipe to the conduit 30, and in said conduit, behind said pipe 50, is a valve 51, comprising flaps opening only in the direction leading from the first cylinder to the second. Thus if the engine should stop with the steam-port 14 closed by the valve 10 the engineer will turn a cock 53 in said pipe 50 and let steam into the second cylinder, and the valve 51 will automatically close and prevent movement of steam into the first cylinder. The second cylinder will then be the driving-cylinder until the engine is started, when the engineer will close the cock 53.

I claim—

1. In a rotary engine, the combination of an annular casing a wheel revolving in said casing and having annular flanges extending outward beyond the inner edge of said casing and outside of said casing, packing between the outer surface of the sides of the casing and the inner surface of said flanges, a shoulder on said wheel, an L-shaped valve reciprocating in an extension of said casing and raised by said shoulder, and a steam-port closed by said L-shaped valve and opening onto said valve in such a direction that the steam tends to open said valve, substantially as described.

2. In a rotary engine, the combination of an annular casing U-shaped in cross-section, a wheel revolving in said casing having a shoulder revolving against the circumferential portion thereof, and having flanges extending outward beyond the inner edge of said casing and outside of said casing, a valve-casing on said annular casing, and a valve reciprocating in said casing, said casing having its walls recessed to receive the ends of said valve, substantially as described.

3. In a rotary engine, the combination of an annular casing, U-shaped in cross-section, a wheel revolving in said casing having a shoulder revolving against the circumferential portion thereof, said shoulder having spring-plates secured at the ends of the sides thereof to pack the same, a valve-casing on the annular casing, said casing having a suitable recess for the reciprocation of the valve, said recess having rounded edges to permit said spring-plate packing to travel past in a reverse direction, and a valve reciprocating therein, substantially as described.

4. In a rotary engine, the combination of an annular casing U-shaped in cross-section, a wheel revolving in said casing having a shoulder revolving against the circumferential portion thereof, a reciprocating L-shaped valve raised by said shoulder, a steam-port closed by the horizontal member of said valve in its reciprocation, the vertical member having a notch in its rear face, and a latch arranged to engage said notch in said valve to uphold the same and close the port, substantially as described.

5. In a rotary engine, the combination of two annular casings, U-shaped in cross-section, a wheel revolving in each casing on a common shaft and having a shoulder revolving against the circumferential portion of the casing, a valve in each casing raised by the shoulder therein, and steam and exhaust ports in each casing, said ports, in the two casings, being oppositely arranged with regard to the valves therein, whereby said wheels are adapted to travel in opposite directions on said shaft when impelled by steam, substantially as described.

6. In a rotary engine, the combination of two annular casings, U-shaped in cross-section, a wheel revolving in each casing on a common shaft, and having a shoulder revolving against the circumferential portion thereof, a reciprocating L-shaped valve in each casing, raised by the shoulder therein, steam and exhaust ports in each casing, a conduit from the exhaust-port from the first casing to the steam-port in the second casing, a valve automatically closing rearward movement of the steam in said conduit, and a suitably-controlled steam-pipe leading direct to said second casing, substantially as described.

In witness whereof I have hereunto set my hand in the presence of two subscribing witnesses.

E. P. COUTURE.

Witnesses:
 FRANCIS M. WRIGHT,
 CHAS. W. SMYTH.